US012748417B2

(12) United States Patent
Marié et al.

(10) Patent No.: US 12,748,417 B2
(45) Date of Patent: Sep. 29, 2026

(54) COMPUTER SYSTEM AND METHOD FOR DETECTING REGULARLY OCCURRING ALARMS IN AUTOMATION AND INDUSTRIAL CONTROL SYSTEMS

(71) Applicant: Schneider Electric USA, Inc., Andover, MA (US)

(72) Inventors: Sylvain Marié, Grenoble (FR); Pablo Knecht, Andover, MA (US); Tarek Lazaar, Andover, MA (US); Souheil Hadj Said, Andover, MA (US); Benjamin Norman, Andover, MA (US); Nejm Eddine Frigui, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/941,566

(22) Filed: Nov. 8, 2024

(65) Prior Publication Data

US 2026/0133572 A1 May 14, 2026

(51) Int. Cl.
*G05B 23/02* (2006.01)

(52) U.S. Cl.
CPC ....... *G05B 23/0272* (2013.01); *G05B 23/027* (2013.01)

(58) Field of Classification Search
CPC .............. G05B 23/0272; G05B 23/027; G05B 19/042; G06F 11/0793; G06F 11/079; G06F 11/0778
See application file for complete search history.

(56) References Cited

U.S. PATENT DOCUMENTS 8,635,182 B2 * 1/2014 Mackay ................. G06Q 10/06 706/55
9,606,520 B2 * 3/2017 Noboa ................... G05B 15/02
(Continued)

FOREIGN PATENT DOCUMENTS

EP 3407150 A2 11/2018

OTHER PUBLICATIONS

Cheng Y., et al., "Pattern matching of alarm flood sequences by a modified Smith-Waterman algorithm", Chemical Engineering Research and Design, vol. 91, No. 6, Jun. 1, 2013, XP055890193, pp. 1085-1094.
(Continued)

*Primary Examiner* — Hoi C Lau
(74) *Attorney, Agent, or Firm* — Patterson + Sheridan, LLP

(57) ABSTRACT

Computer monitoring system and method for determining one or more clusters of regularly occurring time periods for alarm events contained in alarm data that includes alarm change of state event and an associated time stamp for each alarm change of state event, wherein each regularly occurring time period is sampled to include a same number of time spaced intervals. Detect alarm events contained in each time spaced interval to associate each time spaced interval with a value dependent upon the detected zero or more alarm events in this interval. Determine vector of alarm state values for each regularly occurring time period. Determine a distance metric between each pair of respective regularly occurring time periods based on the determined vectors of alarm state values. Determine one or more clusters of regularly occurring time periods of alarm events in the defined time period based upon analysis of the determined distance metric.

36 Claims, 9 Drawing Sheets

(56) References Cited

U.S. PATENT DOCUMENTS

| | | | | |
|---|---|---|---|---|
| 10,281,363 | B2 * | 5/2019 | Vitullo | G01M 99/00 |
| 10,373,056 | B1 * | 8/2019 | Andoni | G06F 17/18 |
| 10,523,495 | B2 * | 12/2019 | Jacobs | H04L 41/0609 |
| 10,878,328 | B2 * | 12/2020 | Mathur | G06N 20/20 |
| 10,962,945 | B2 * | 3/2021 | Park | G06F 16/288 |
| 11,061,946 | B2 * | 7/2021 | Petroni | G06Q 40/04 |
| 11,188,405 | B1 * | 11/2021 | Garty | G06F 11/0751 |
| 11,210,160 | B1 * | 12/2021 | Dukhovny | G06F 11/1438 |
| 11,436,196 | B2 * | 9/2022 | Shi | G06F 16/285 |
| 11,720,599 | B1 * | 8/2023 | Lin | G06F 16/2246 707/738 |
| 11,887,465 | B2 * | 1/2024 | Ghosh | G08B 29/185 |
| 11,924,227 | B2 | 3/2024 | Pi et al. | |
| 12,066,915 | B1 * | 8/2024 | Deaderick | G06F 11/3447 |
| 12,079,100 | B1 * | 9/2024 | Deaderick | G06F 11/3075 |
| 12,086,045 | B1 * | 9/2024 | Deaderick | G06F 11/3452 |
| 12,182,169 | B1 * | 12/2024 | Deaderick | G06F 11/3447 |
| 12,224,918 | B2 * | 2/2025 | Mishra | G05B 23/0272 |
| 12,282,883 | B2 * | 4/2025 | Amores | G06Q 10/08 |
| 12,435,893 | B2 * | 10/2025 | Chauhan | F24F 7/06 |
| 12,456,362 | B2 * | 10/2025 | Syed | G08B 25/001 |
| 12,519,805 | B2 * | 1/2026 | Bhatia | H04L 63/1416 |
| 12,537,734 | B2 * | 1/2026 | Sanchez | H04L 41/0631 |
| 2017/0006135 | A1 * | 1/2017 | Siebel | G06F 8/10 |
| 2017/0161614 | A1 * | 6/2017 | Mehta | G06N 20/00 |
| 2017/0276571 | A1 * | 9/2017 | Vitullo | G06Q 10/06 |
| 2017/0357908 | A1 | 12/2017 | Cabadi et al. | |
| 2019/0165989 | A1 * | 5/2019 | Jacobs | G05B 23/0235 |
| 2019/0187672 | A1 * | 6/2019 | Hollender | G05B 19/0428 |
| 2020/0334093 | A1 * | 10/2020 | Dubey | G06F 18/23 |
| 2021/0042270 | A1 * | 2/2021 | Shi | G06F 16/174 |
| 2021/0165476 | A1 | 6/2021 | Menzel et al. | |
| 2022/0049868 | A1 * | 2/2022 | Chauhan | G06N 20/00 |
| 2022/0207988 | A1 * | 6/2022 | Ghosh | G08B 29/185 |
| 2022/0308974 | A1 * | 9/2022 | Gupta | G06F 11/321 |
| 2023/0216865 | A1 * | 7/2023 | Bhatia | H04L 63/1416 726/23 |
| 2024/0187313 | A1 * | 6/2024 | Mishra | H04L 41/0604 |
| 2025/0086219 | A1 * | 3/2025 | Platais | H04L 41/069 |
| 2025/0201146 | A1 * | 6/2025 | Goren | G08G 1/0962 |
| 2025/0202760 | A1 * | 6/2025 | Sanchez | H04L 41/0631 |
| 2026/0133571 | A1 * | 5/2026 | Marié | G05B 23/027 |
| 2026/0133572 | A1 * | 5/2026 | Marié | G05B 23/0272 |
| 2026/0134770 | A1 * | 5/2026 | Marié | G05B 23/0275 |

OTHER PUBLICATIONS

International Search Report and Written Opinion received for PCT Patent Application No. PCT/US2025/054492, mailed on Feb. 20, 2026, 13 pages.

International Search Report and Written Opinion received for PCT Patent Application No. PCT/US2025/054616, mailed on Feb. 23, 2026, 11 pages.

* cited by examiner

| YearAndDay | 2019-12-31 | 2020-01-01 | 2020-01-02 |
|---|---|---|---|
| 2019-12-31 | 0.000000 | 0.043056 | 0.000694 |
| 2020-01-01 | 0.043056 | 0.000000 | 0.043750 |
| 2020-01-02 | 0.000694 | 0.043750 | 0.000000 |

FIG.10

COMPUTER SYSTEM AND METHOD FOR DETECTING REGULARLY OCCURRING ALARMS IN AUTOMATION AND INDUSTRIAL CONTROL SYSTEMS

BACKGROUND

1. Field

The illustrated embodiments relate generally to the field of automation and industrial control (AIC) systems, such as a building management system (BMS), and a Supervisory Control and Data Acquisition (SCADA) system. The illustrated embodiments more particularly relate to systems and methods for logically detecting and grouping regularly occurring alarms in automation and industrial control systems using Artificial Intelligence (AI).

2. Description of Related Art

An automation and industrial control (AIC) system, such as a building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that can manage building functions or devices, or any combination thereof. BMS devices may be installed in any environment (e.g., an indoor area or an outdoor area) and the environment may include any number of buildings, spaces, zones, rooms, or areas. A BMS may include a variety of devices/assets (e.g., HVAC devices, controllers, chillers, fans, sensors, etc.) configured to facilitate monitoring and controlling the building space.

Currently, many building management systems provide control of an entire facility, building, or other environment. The building management system may control HVAC systems, water system, lights, air quality, security, and/or any other aspect of the facility within the purview of the building management system. These systems may require skilled persons to adjust, control, and otherwise operate the building management system, due to the complexity. In large facilities or buildings, this management can be labor intensive. Moreover, in buildings where dynamic management of the building management system is required (e.g., buildings with multiple independent HVAC requirements), advanced control strategies may be required.

Once a BMS system is commissioned and operational at a user site, a large number of alarm signals are typical generated by the BMS relating to the large numbers of assets managed by the BMS. Typically, many of these alarms are what are known as “nuisance alarms”. A nuisance alarm generally refers to situations where an alarm is triggered by a non-threatening, but potentially annoying or disruptive event, such as a regularly occurring alarm over a certain time period. For instance, an alarm may be user configured in the BMS to be triggered when a temperature sensed by a temperature sensing asset managed by the BMS raises above a certain temperature. However, if it was set incorrectly (e.g., to be triggered when the room temperature rises above 70° F., but normal operating temperature of the room is 69° F., a chattering type nuisance alarm (described further below) will often be triggered (e.g., the room temperature will often fluctuate above and below the alarm upper threshold (i.e., 70° F.)). Thus, nuisance alarms are a serious problem, as the building manager is likely to ignore, or even disable them.

Hence, in accordance with the illustrated embodiments described herein, a problem to solve is to analyze, in a scalable/fast way, hundreds of thousands of “alarm series” generated on a customer site by an AIC system. Managers/Users of such a BMS are often overwhelmed by the volume of alarms, and eventually ignore and/or disable them, as mentioned above. Thus, detecting regularly occurring alarms is a key to automatically group/filter alarms in monitoring tools such that users can separately attend to regularly occurring alarms from non-regularly occurring alarms. Additionally, it is also significant to reduce the “noise” by recommending/determining alarm configuration adjustments such as increasing a threshold, increasing a delay, etc.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, described is a computer system and method that provides detection of regularly occurring alarms to automatically group/filter alarms in monitoring tools such that users only have to care about a group and not about its redundant constituents. By streamlining and automating this critical aspect of AIC management, the illustrated embodiments provide significant improvements in the way building operators optimize their computer controlled building systems with regard to processing regularly occurring alarms.

In accordance with an aspect of the illustrated embodiments, described is a computer monitoring system and method for determining one or more clusters of regularly occurring time periods for alarm events contained in alarm data resident in a computer database managed by an automated and industrial control (AIC) system, wherein each regularly occurring time period is to be defined by a same number of time spaced intervals. Captured from the computer database is alarm data for each of a plurality of regularly occurring time periods contained in a defined time period, wherein the captured alarm data includes alarm change of state event and an associated time stamp for each alarm change of state event. The captured alarm data is analyzed to detect alarm events contained in each time spaced interval, for each regularly occurring time period. A vector of alarm state values is then computed for each regularly occurring time period such that an alarm state value is associated with a time spaced interval, dependent upon: 1) a detected alarm event when there is at least one detected alarm event in the associated time spaced interval; or 2) with at least one other alarm state value in a previous time spaced interval when there is no detected alarm event in the associated time spaced interval. For instance, each value in the vector of alarm state values is computed as: 1) a “1” when a last alarm event in the time spaced interval is an alarm event; 2) a “0” when the last alarm event in the time spaced interval is a reset event; and 3) equal to a value of a previous time spaced interval containing alarm events when there are no alarm events in the associated time spaced interval. A distance metric is then determined between each pair of respective regularly occurring time periods based on the determined vectors of alarm state values in each respective pair of regularly occurring time periods. One or more clusters of regularly occurring time periods of alarm events is/are determined in the defined time period, based upon analysis of the determined distance metric between each pair of respective regularly occurring time periods. A tangible output is generated/provided identifying the determined one or more clusters of regularly occurring time periods of alarm events in the defined time period.

Thus, the illustrated embodiments for detecting regularly occurring alarms in an automated and industrial control system (AIC) provides a technical improvement to a computer-controlled AIC system by automating the process for detecting and grouping regularly occurring alarms in a AIC managed computer database.

BRIEF DESCRIPTION OF THE DRAWINGS

So that those skilled in the art to which the subject disclosure appertains will readily understand how to make and use the devices and methods of the subject disclosure without undue experimentation, preferred illustrated embodiments thereof will be described in detail herein below with reference to certain figures, wherein:

FIG. 10 illustrates a graphical table depicting determining a distance matrix between regularly occurring time periods.

DESCRIPTION OF CERTAIN EMBODIMENTS

Figure 1:
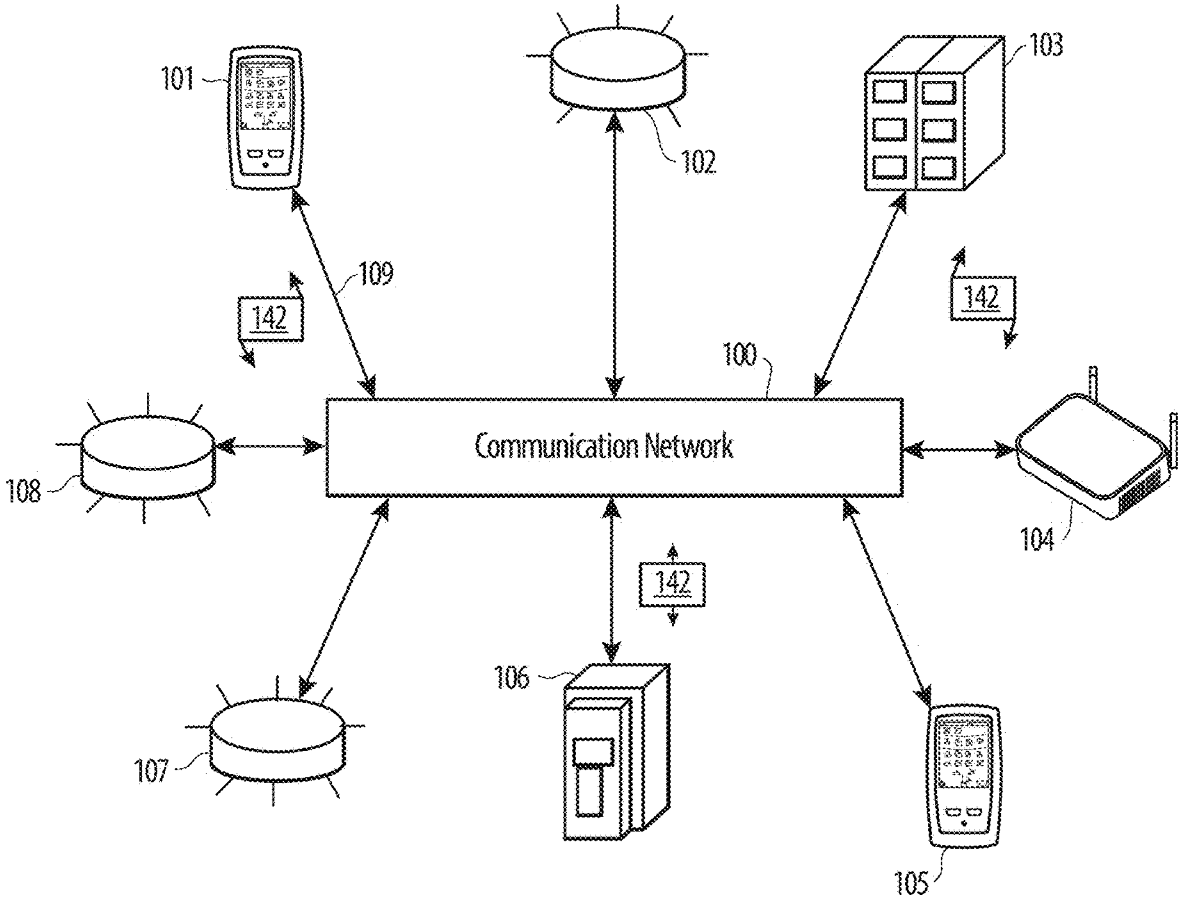
FIG. 1 illustrates an example communication network utilized with one or more of the illustrated embodiments.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this illustrated embodiment belongs. Although any methods and materials similar or equivalent to those described herein can also be used in the practice or testing of the illustrated embodiments, exemplary methods and materials are now described.

It must be noted that as used herein and in the appended claims, the singular forms “a”, “an,” and “the” include plural referents unless the context clearly dictates otherwise. Thus, for example, reference to “a stimulus” includes a plurality of such stimuli and reference to “the signal” includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term “software” is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented. It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Specifically, regarding buildings/plants/grids, Building Automation Control Network (BACNet), Local Operating Network (LonWorks), a Modbus protocol, OPC Unified Architecture (OPC-UA), and the IEC61850 standard may be used as communication links, for instance.

FIG. 1 is a schematic block diagram of an example communication network 100 illustratively comprising nodes/devices 101-108 (e.g., sensors 102, computing monitoring device 103, smart phone devices 105, web servers/computer systems 106 (e.g., a BMS system), computer systems 103, switches 108, databases, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the illustrated embodiments may be embodied as a system, method or computer program product. Accordingly, aspects of the illustrated embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrated embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the illustrated embodiments may be written in any combination of one or more programming languages, including an object oriented programming language such as Python, Golang, Ruby, ASP.NET, Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrated embodiments are described below with reference to flowchart illustrations and/or block diagrams of methods, apparatus (systems) and computer program products according to the illustrated embodiments. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
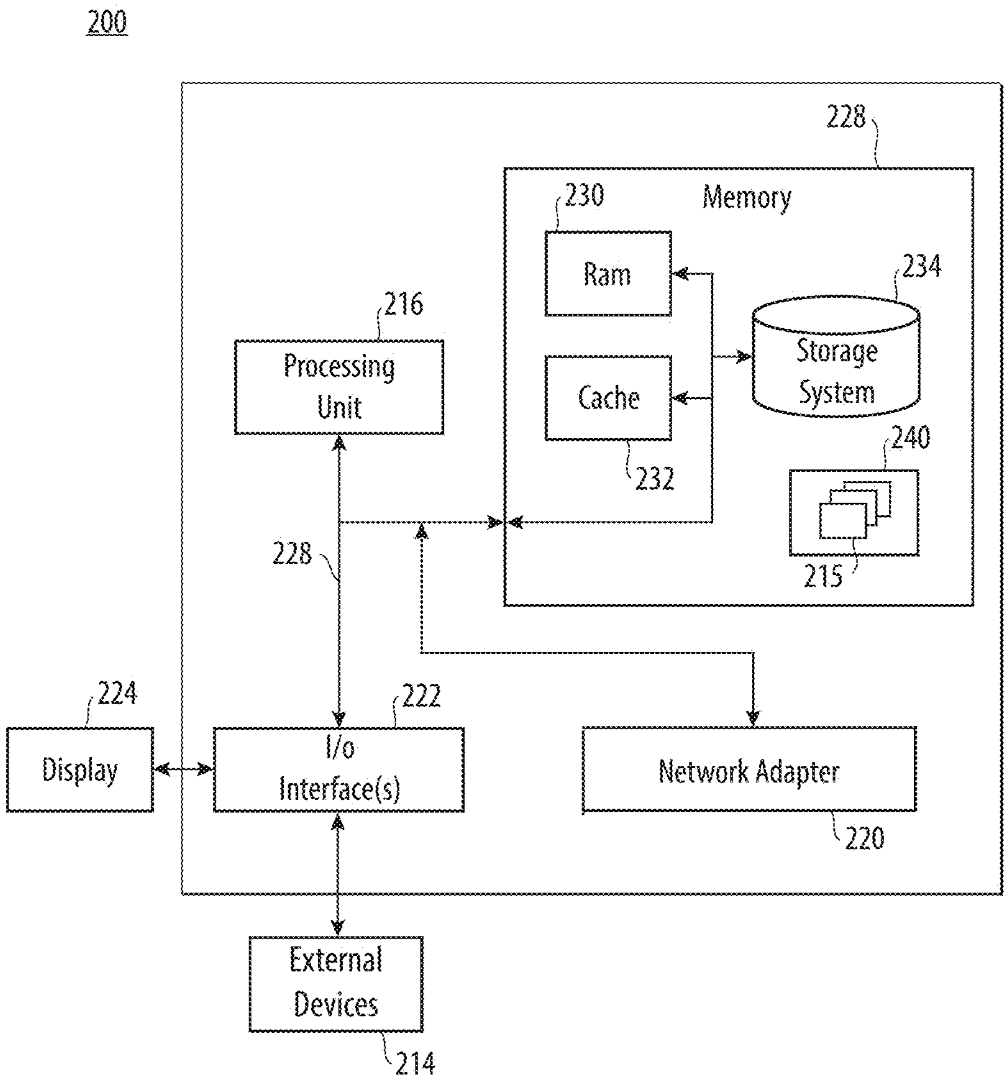
FIG. 2 illustrates an example network device/node utilized with one or more of the illustrated embodiments.

FIG. 2 is a schematic block diagram of an example network computing device 200 (e.g., computing monitoring device 103, BMS computer system 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100. It is to be appreciated and understood that in certain illustrated embodiments, the computer monitoring device 103 as described herein, may be a separate computer component/system (e.g., network 100 coupled), or may be integrated as unitary component/system with a AIC (e.g., BMS) 106 computer system.

Device 200 is intended to represent any type of computer system capable of carrying out the teachings of various illustrated embodiments. Device 200 is only one example of a suitable system and is not intended to suggest any limitation as to the scope of use or functionality of the illustrated embodiments described herein. Regardless, computing device 200 is capable of being implemented and/or performing any of the functionality set forth herein, including a AIC computer system 106, and a computer monitoring system 103 configured and operative, preferably using one or more artificial intelligence techniques, to detect regularly occurring alarms and to automatically group/filter regularly occurring alarms in monitoring tools such that users can separately attend to (non-regularly) alarms, separate from regularly occurring alarms.

Computing device 200 is operational with numerous other special purpose computing system environments or configurations. Examples of well-known computing systems, environments, and/or configurations that may be suitable for use with computing device 200 include, but are not limited to, cloud computing systems (including, but not limited to: Infrastructure as a Service (IaaS); Software as a Service (Saas); Platform as a Service (PaaS); and Private cloud), personal computer systems, server computer systems, thin clients, thick clients, hand-held or laptop devices, multiprocessor systems, microprocessor-based systems, programmable consumer electronics, network PCs, minicomputer systems, and distributed data processing environments that include any of the above systems or devices, and the like. Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices. In accordance with the illustrated embodiments, computing device 200 (e.g., computer monitoring system 103) is configured and operative, based upon analysis of alarm data captured from an AIC system (e.g., BMS 106), to detect regularly occurring alarms, and to automatically group/filter regularly occurring alarms in monitoring tools such that users only have to care about a group and not about its regularly occurring constituents, preferably using one or more AI techniques.

The components of device 200 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random-access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of illustrated embodiments.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of the illustrated embodiments as described herein, including, but not limited to, preferably using one or more AI techniques, to detect regularly occurring alarms in an AIC system, and to automatically group/filter regularly occurring alarms in monitoring tools such that users only have to care about a group and not about its regularly occurring constituents, It is to be appreciated and understood device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: big data technologies encompassing large and diverse datasets that are significant in volume, which are commonly used in machine learning, predictive modeling, and other advanced analytics to solve business problems and make informed decisions; non-relational databases (NoSQLs); Blob storage; relational databases (SQL); as well as microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which the below described illustrated embodiments may be implemented. FIGS. 1 and 2 are exemplary of a suitable environment and are not intended to suggest any limitation as to the structure, scope of use, or functionality of an illustrated embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

It is to be understood the embodiments described herein are preferably provided with self-learning/Artificial Intelligence (AI) to detect regularly occurring alarms in an AIC system, and to automatically group/filter regularly occurring alarms in monitoring tools such that users only have to care about a group and not about its regularly occurring constituents. Thus, preferably integrated into a computer monitoring system (e.g., 103) coupled to a plurality of external databases/data sources is an AI system (e.g., a BMS System 106) that implements machine learning and artificial intelligence algorithms to conduct one or more of the above-mentioned regularly occurring alarm detection and grouping/filtering tasks, preferably on an automated basis. For instance, the AI system may include two subsystems: a first sub-system that learns from historical data; and a second subsystem to identify and recommend one or more parameters or approaches based on the learning. It should be appreciated that although the AI system may be described as two distinct subsystems, the AI system can also be implemented as a single system incorporating the functions and features described with respect to both subsystems.

In accordance with the illustrated embodiments described herein, artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

Also, in accordance with the illustrated embodiments, an artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value. The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function. The purpose of the learning of the artificial neural network may be to determine the model parameters that minimize a loss function. The loss function may be used as an index to determine optimal model parameters in the learning process of the artificial neural network. Machine learning may be classified into supervised learning, unsupervised learning, and reinforcement learning according to a learning method. The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Figure 3:
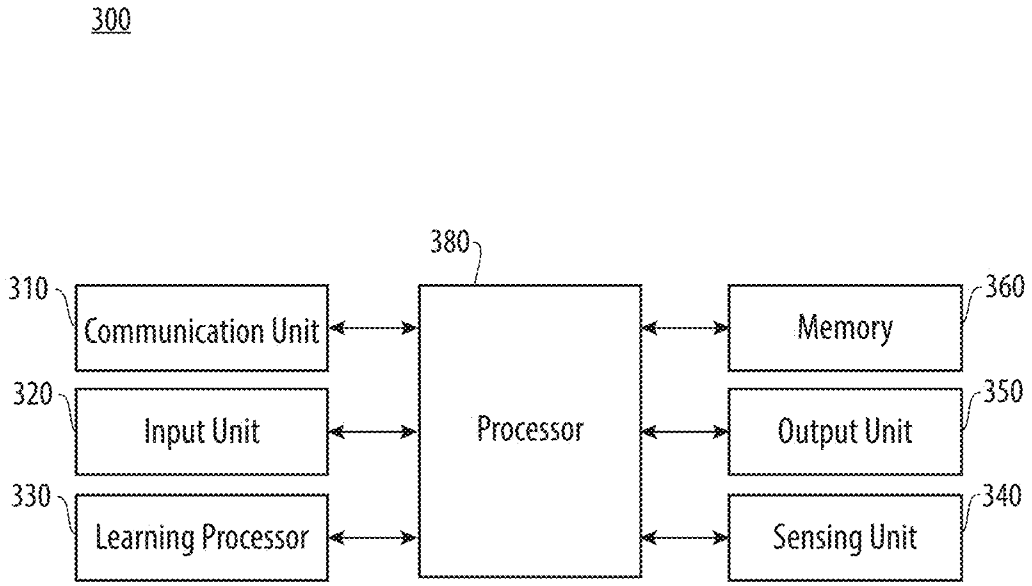
FIG. 3 illustrates a diagram depicting an Artificial Intelligence (AI) device utilized with one or more of the illustrated embodiments.

Machine learning, which is implemented as a deep neural network (DNN) including a plurality of hidden layers among artificial neural networks, is also referred to as deep learning, and the deep learning is part of machine learning. FIG. 3 illustrates an AI device 300 according to an illustrated embodiment. In accordance with the illustrated embodiments, the AI device 300 is preferably integrated into in verification computer system 103.

Referring now FIG. 3, in conjunction with FIGS. 1 and 2, the AI device 300 is operatively coupled to, or integrated with computing device 200, in accordance with the illustrated embodiments described herein. AI device 300 preferably includes a communication unit 310, an input unit 320, a learning processor 330, a sensing unit 340, an output unit 350, a memory 370, and a processor 380. The communication unit 310 may transmit and receive data to and from external devices such as other AI devices 300*a* to 300*e* and an AI server 400 (FIG. 4) by using wire/wireless communication technology. For example, the communication unit 310 may transmit and receive sensor information, a user input, a learning model, and a control signal to and from external devices.

The communication technology used by the communication unit 310 preferably includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 320 may acquire various kinds of input data, including, but not limited to an alarm data stream signal (e.g., a single binary alarm timeseries of alarm events) received from a BMS 106, to be used when an output is acquired by using learning model. The input unit 320 may acquire raw input data. In this case, the processor 380 or the learning processor 330 may extract an input feature by preprocessing the input data. The learning processor 330 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 330 may perform AI processing together with the learning processor 330 of the AI server 400, and the learning processor 330 may include a memory integrated or implemented in the AI device 300. Alternatively, the learning processor 330 may be implemented by using the memory 370, an external memory directly connected to the AI device 300, or a memory held in an external device. The sensing unit 340 may acquire at least one of internal information about the AI device 300, ambient environment information about the AI device 300, and user information by using various sensors.

The output unit 350 preferably includes a display unit for outputting/displaying relevant information to a user in accordance with the illustrated embodiments described herein. The memory 370 preferably stores data that supports various functions of the AI device 300. For example, the memory 370 may store input data acquired by the input unit 320, learning data, a learning model, a learning history, and the like.

The processor 380 preferably determines at least one executable operation of the AI device 300 based on information determined or generated by using a data analysis algorithm or a machine learning algorithm. The processor 380 may control the components of the AI device 300 to execute the determined operation. To this end, the processor 380 may request, search, receive, or utilize data of the learning processor 330 or the memory 370. The processor 380 may control the components of the AI device 300 to execute the predicted operation or the operation determined to be desirable among the at least one executable operation. When the connection of an external device is required to perform a determined operation, the processor 380 may generate a control signal for controlling the external device and may transmit the generated control signal to the external device. The processor 380 may acquire intention information for the user input and may determine the user's requirements based on the acquired intention information. The processor 380 may acquire the intention information corresponding to the user input by using at least one of a speech to text (STT) engine for converting speech input into a text stream or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 330, may be learned by the learning processor 340 of the AI server 400, or may be learned by their distributed processing. The processor 380 may collect history information including the operation contents of the AI device 300 or the user's feedback on the operation and may store the collected history information in the memory 370 or the learning processor 330 or transmit the collected history information to the external device such as the AI server 400. The collected history information may be used to update the learning model.

The processor 380 may control at least part of the components of AI device 300 so as to drive an application program stored in memory 370. Furthermore, the processor 380 may operate two or more of the components included in the AI device 300 in combination so as to drive the application program.

Figure 4:
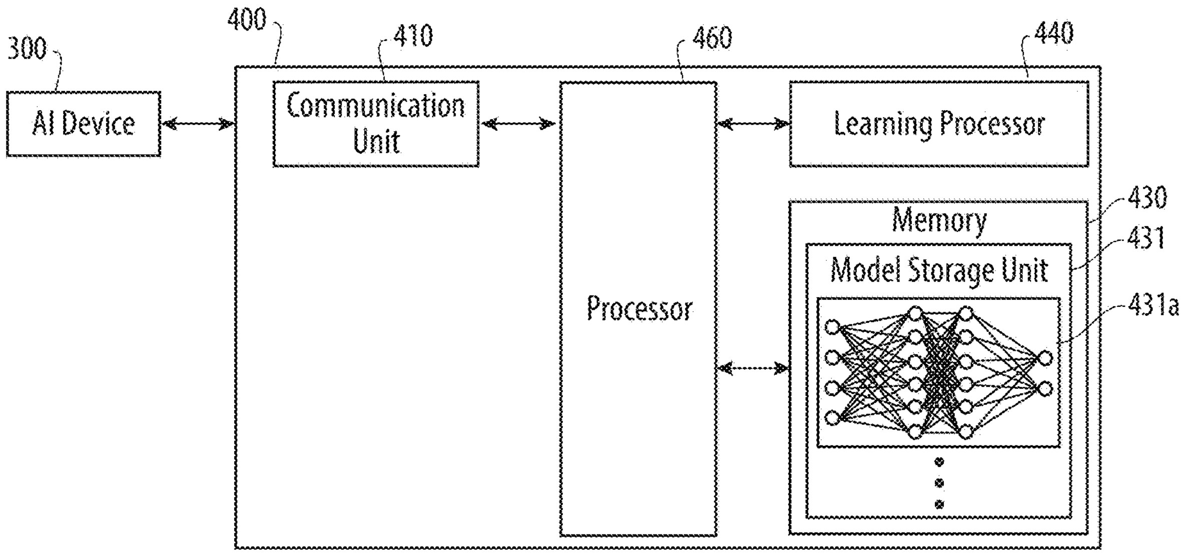
FIG. 4 illustrates a diagram depicting an AI server utilized with one or more of the illustrated embodiments.

FIG. 4 illustrates an AI server 400 according to the illustrated embodiments. It is to be appreciated that the AI server 400 may refer to a device that learns an artificial neural network by using a machine learning algorithm or uses a learned artificial neural network. The AI server 400 may include a plurality of servers to perform distributed processing or may be defined as a 5G network. At this time, the AI server 400 may be included as a partial configuration of the AI device 300 and may perform at least part of the AI processing together. The AI server 400 may include a communication unit 410, a memory 430, a learning processor 440, a processor 460, and the like. The communication unit 410 can transmit and receive data to and from an external device such as the AI device 300. The memory 430 may include a model storage unit 431. The model storage unit 431 may store a learning or learned model (or an artificial neural network 431*a*) through the learning processor 440.

The learning processor 440 may learn the artificial neural network 431*a* by using the learning data. The learning model may be used in a state of being mounted on the AI server 400 of the artificial neural network or may be used in a state of being mounted on an external device such as the AI device 300. The learning model may be implemented in hardware, software, or a combination of hardware and software. If all or part of the learning models are implemented in software, one or more instructions that constitute the learning model may be stored in memory 430. The processor 460 may infer the result value for new input data by using the learning model and may generate a response or a control command based on the inferred result value.

With the exemplary communication network 100 (FIG. 1), computing device 200 (FIG. 2), AI device 300 (FIG. 3) and AI server 400 (FIG. 4) being generally shown and discussed above, description of certain illustrated embodiments will now be provided with below reference to FIGS. 5-9 (and with continuing reference to FIGS. 1-4). It is to be understood and appreciated that FIGS. 1-4 are intended to provide a brief, general description of an illustrative and/or suitable exemplary environment in which the below described illustrated embodiments may be implemented. FIGS. 1-4 are exemplary of a suitable environment and are not intended to suggest any limitation as to the structure, scope of use, or functionality of an illustrated embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 5:
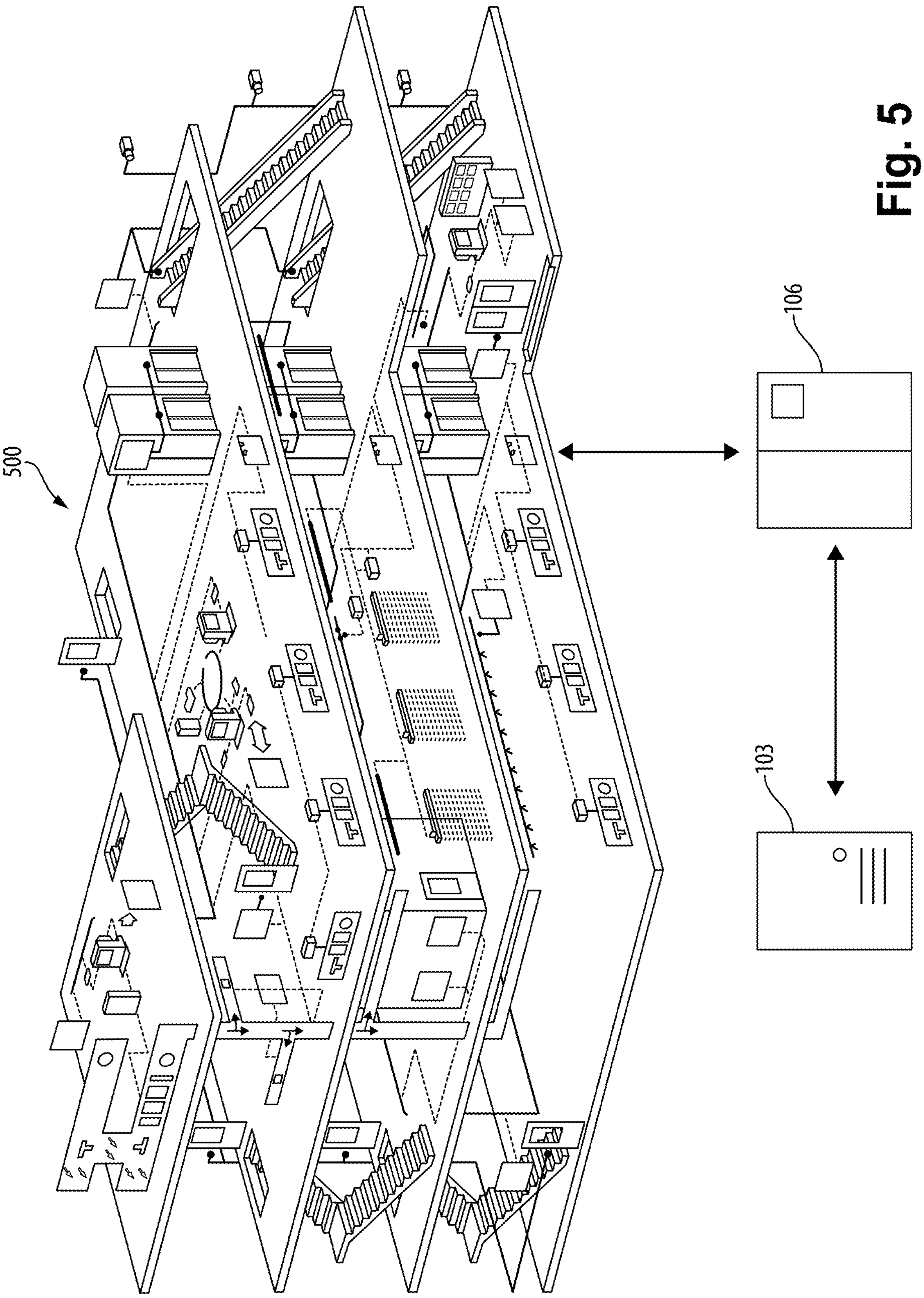
FIG. 5 illustrates a simplified system level diagram of a BMS in accordance with the illustrated embodiments.

In accordance with the illustrated embodiments, and with reference to FIG. 5, it is to be understood and appreciated that an AIC system, such as a building management system (BMS), is a computer-based system 106 that monitors and controls a building's 500 mechanical and electrical equipment including (including, but not limited to; HVAC (heating, ventilation, air conditioning), lighting, power systems, fire systems, and security systems). The BMS 106 may be configured to collect data samples from building equipment (e.g., sensors, controllable devices, building subsystems, etc.) and generate raw timeseries data from the data samples. The BMS 106 processes the raw timeseries data using a variety of data platform services to generate optimized timeseries data (e.g., data rollup timeseries, virtual point timeseries, fault detection timeseries, etc.). The optimized timeseries data can be provided to various applications and/or stored in local or hosted storage. In some embodiments, the BMS 106 includes three different layers that separate (1) data collection, (2) data storage, retrieval, and analysis, and (3) data visualization. This allows the BMS 106 to support a variety of applications that use the optimized timeseries data and allows new applications to reuse the infrastructure provided by the data platform services.

It is to be further understood and appreciated that while the illustrated embodiments are described relative for use with a BMS 106, it is not to be understood to be limited thereto as the computer monitoring system 103 in accordance with the illustrated embodiments may have application to other automation and industrial control system (AIC) systems, such as Supervisory Control and Data Acquisition (SCADA) systems. Thus, in this instance, the BMS 106 is a SCADA system whereupon the computer monitoring system 103 is operatively coupled to a SCADA system for detecting clusterings of redundant/regularly occurring alarm events, and grouping such clusterings. As is known, a SCADA system is computer-based system utilizing software and hardware to monitor, control, and analyze industrial processes and devices. SCADA systems can be used remotely or on-site to collect data from industrial equipment, which supervisors can then use to optimize and control operations. SCADA systems are often referred to as automation technology and are used in many industries, including Energy and power, Data centers, Energy grids, Power systems, Manufacturing, Food and beverages, Oil and gas, Water and wastewater, and Transportation. For ease of description purposes, the computer monitoring system 103 in accordance with the illustrated embodiments is described for use with a BMS 106, but as mentioned above, it has application with other systems, such as a SCADA system, and thus is not to be understood to be limited to application with a BMS 106.

Figure 6:
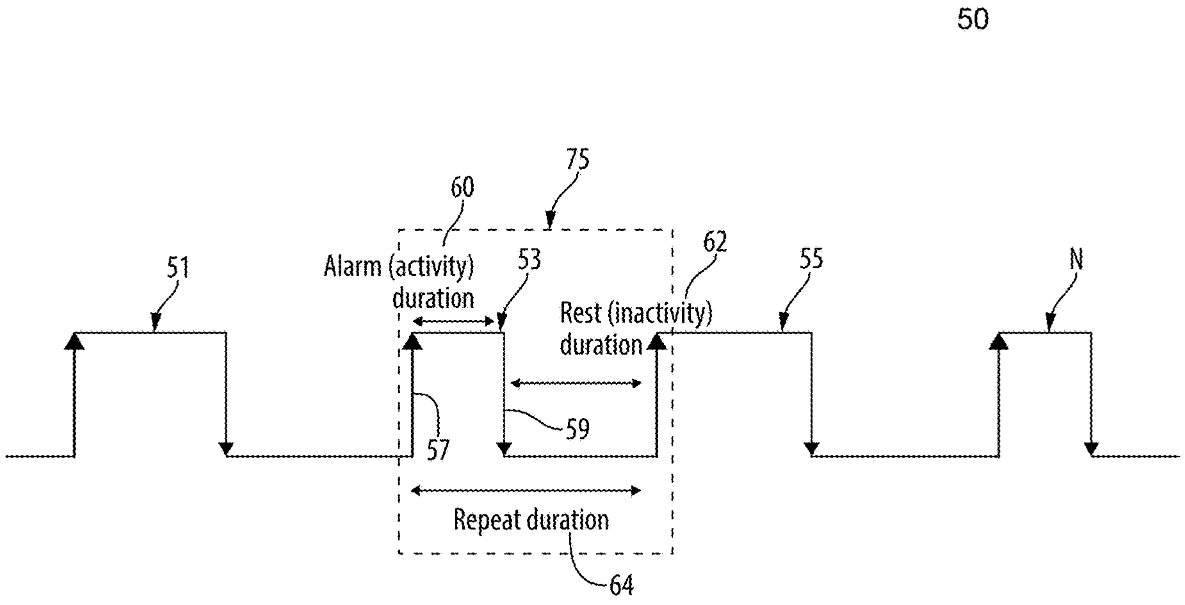
FIG. 6 illustrates an alarm data stream consisting of a single binary alarm timeseries (t) of N alarms in accordance with the illustrated embodiments.
Figure 7:
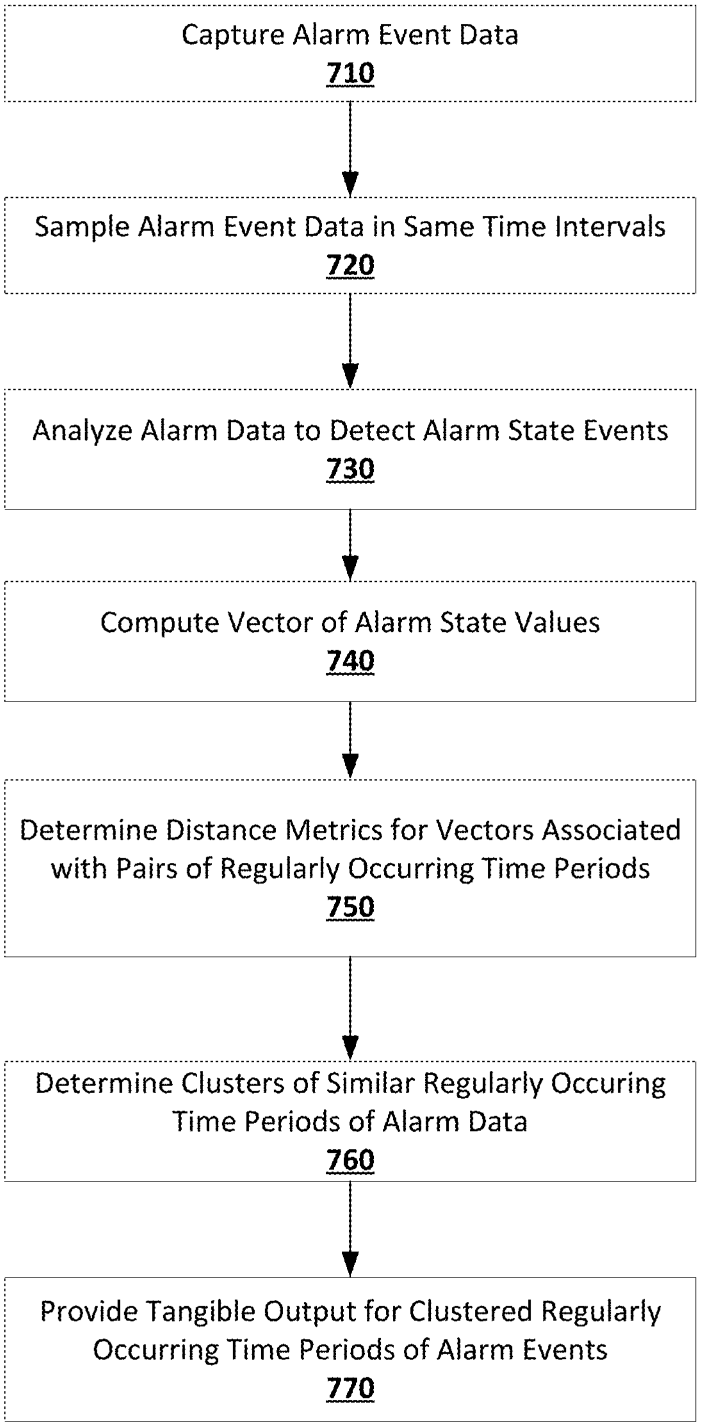
FIG. 7 illustrates a process for detecting and grouping regularly occurring alarms in accordance with the illustrated embodiments.

In accordance with the illustrated embodiments, and with reference to FIGS. 5-9, a computer monitoring system 103, communicatively coupled to the BMS 106 (FIG. 5) is operative and configured to retrieve electronic data, preferably from a database associated with the BMS 106 (preferably via an application programming interface (API), via a communications network). In accordance with the illustrated embodiments, the computer monitoring system 103, interacts with the BMS 106, preferably via an API and communications network 100, to retrieve certain data from the BMS 106, and is operative and configured to provide detection, and grouping, of regularly occurring alarms by analyzing an alarm data stream signal 50 (received from the BMS 106) (e.g., a single binary alarm timeseries (t) of N alarms 51, 53, 55). For instance, as shown in FIG. 6, an alarm (e.g., 53) in an alarm data stream signal 50 is preferably defined by the time defined segment (e.g., Alarm (activity) duration 60) defined between an upward pointing arrow (designating an active alarm event indicating a transition from an inactive to an active alarm state(57)) and a succeeding downward arrow (designating a reset event, indicating a transition from an active to an inactive alarm state(59)). In particular, the "alarm duration" 60 is a period of time the alarm is active, the "rest duration" period 62 is a period of time the alarm is inactive, whereupon the "repeat duration" period 64 is the aggregate of a period of time the alarm is active (60) and inactive (62).

With reference now to FIGS. 7-10, and in accordance with the illustrated embodiments, a process (700) is now described for determining one or more clusters of similar regularly occurring time periods of alarm data, wherein each regularly occurring time period is to be defined by a same number of sampled time spaced intervals. It is to be understood, each regularly occurring time period is preferably a calendar defined time period, such as 24 hr day, a weekly period consisting of seven (7) days, a weekend period consisting of a Saturday and Sunday, etc. For ease of description purposes, the regularly occurring time period in below described process 700 is to be defined by a 24 hr day (which regularly occurring time period is not to be limited thereto).

Starting at step 710, alarm events in an alarm data stream 50 are received/captured in computer monitoring device 103 from an AIC system (e.g., building management system (BMS) 106), preferably for a defined time period (which may be user defined, such as a calendar month). As mentioned above with regard to process 700, it is to be appreciated that the alarm data stream 50 received/captured from the BMS 106 that monitors a building 500 is an electronic signal consisting of continuously monitored time defined variables associated with an asset managed by the BMS 106 (e.g., a single binary alarm timeseries (t) of N alarms 51, 53, 55, each including change of state event data (e.g., 57, 59), and an associated time stamp for each change of state event).

Figure 8:
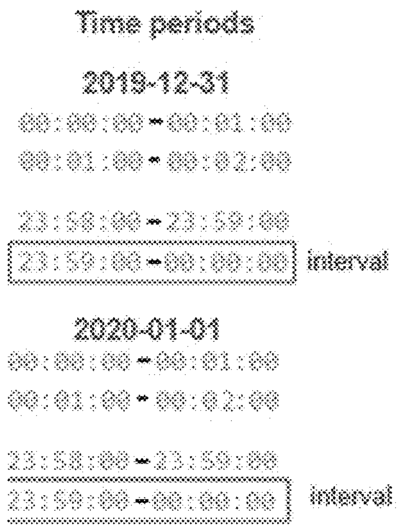
FIG. 8 illustrates a graphical table depicting sampling alarm data for regularly occurring time periods into same time intervals.
Figure 9:
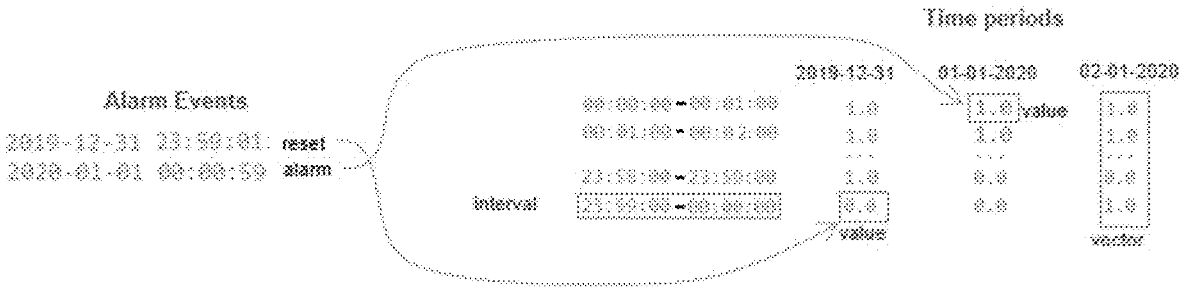
FIG. 9 illustrates a graphical table depicting computing a vector of alarm state values for each regularly occurring time period.

Next, at step 720, and with reference to FIG. 8, each of the regularly occurring time periods (e.g., 1120, 1122) (e.g., a 24 hr day) in the defined time period is sampled by the computer monitor device 103 in a same number of time spaced intervals (e.g., 1 min) (e.g, 1110 to 111N).

At step 730 (and with reference now to FIG. 9), the computer monitor device 103 analyzes the sampled alarm data 50 to detect whether each time spaced interval (e.g., 1110), for each regularly occurring time period (e.g., 1120, 1122), contains either an alarm activation event (e.g., 1140) or an alarm reset event (e.g., 1142), or several such events, or none.

Next at step 740 (and with continuing reference to FIG. 9), the computer monitor device 103 computes a vector of alarm state values (e.g., 1160) for each regularly occurring time period (e.g., 1162). In accordance with the illustrated embodiments, an alarm state value (e.g., 1164) is associated with a time spaced interval (e.g. 1110), dependent upon: 1) a detected alarm event when there is at least one detected alarm event (e.g., 1140) in the associated time spaced interval (e.g., 1110); or 2) with at least one other alarm state value in a previous time spaced interval when there is no detected alarm event in the associated time spaced interval. For instance, each time spaced interval (e. g, 1110 to 111N) for each regularly occurring time period (e.g., 1120, 1122) is assigned either a first value (e.g., 1150) if there is an "activation" alarm event, or a second value (e.g., 1152) if there is a "reset" alarm event. It is to be appreciated and understood that if multiple events are received in a single time spaced interval, a single value (first or second) is assigned, preferably according to the last alarm event received in the time spaced interval. And if no alarm events are in a time spaced interval, a special "not available" (N/A) indicator value is preferably assigned.

In accordance with the current illustrated embodiments, the first value is a binary value of "1" (e.g., 1150), and the second value is a binary value "0" (e.g., 1150), and if no alarm events are in a time spaced interval, the special "not available" (N/A) indicator value associated with this time spaced interval is replaced with a value equal to the value of the last of the previous time spaced intervals containing at least one alarm event. Thus, it is to be appreciated and understood the computer monitoring device 103 is configured and operative to assign for each regularly occurring time period (e.g., 1120, 1122), each time spaced interval (e.g., 1110 to 111N) with a value dependent upon the detected zero or more alarm events in this interval in the captured alarm data 50, by leveraging the abovementioned value and replacing the "not available" indicator based on previous interval values, preferably using forward filling interpolation.

Next, at step 750 (and with reference now to FIG. 10), the computer monitoring device 103 determines a distance metric (e.g., 1310) between each pair of respective regularly occurring time periods (e.g., 1320, 1330) based on the determined vectors of alarm state values in each respective pair of regularly occurring time periods (e.g., 1320, 1330). In certain embodiments, this distance metric (e.g., 1310) is a hamming distance, wherein determining the hamming distance between each successive time spaced regularly occurring time period may further include normalizing each hamming distance.

At step 760, the computer monitor device 103 is further configured to determine one or more clusters of regularly occurring time periods of alarm events in the defined time period, based upon analysis of the determined distance metric (e.g., hamming distance) between each pair of respective regularly occurring time periods. In certain embodiments, determining one or more clusters of regularly occurring time periods of alarm events includes analyzing each cluster of regularly occurring time periods of alarm events to determine certain metadata associated with each cluster, to then analyze the determined metadata for each cluster of regularly occurring time periods of alarm events to identify one or more clusters as a valid alarm periodicity cluster. In accordance with certain illustrated embodiments, the computer monitor device 103 is configured to cluster similar regularly occurring time periods of alarms data using a plurality of unsupervised learning clustering algorithms, such as (but not limited to): a k-means clustering algorithm, k-medoids clustering algorithm, agglomerative clustering, and spectral clustering. It is to be appreciated, the unsupervised learning clustering algorithms, and their respective hyperparameter value(s), are selected according to a clustering goodness metric, whereby the algorithm and hyperparameter value(s) leading to the highest score value is selected for determining the regularly occurring time period clusters to be analyzed for determining the certain metadata associated with each cluster. Preferably, the clustering goodness metric is either (but is not limited to) a: silhouette score, a Calinski-Harabasz Index, or a Davies-Bouldin index, or a combination thereof.

Next, at step 770, the computer monitor device 103 provides tangible output identifying the determined one or more periodicity clusters of alarm events for the regularly occurring time periods (e.g., 1210), which may include causing a graphical user interface (GUI) to be generated on a computer display graphically indicating each identified valid alarm periodicity cluster of regularly occurring time periods.

It is to be appreciated and understood that detecting regularly occurring alarms is a significant improvement for automatically grouping/filtering alarms in monitoring tools (e.g., computer monitoring tool 103) such that users can separately attend to regularly occurring alarms from non-regularly occurring alarms. For instance, in certain embodiments, the computer monitoring tool 103 is configured and operative to reduce the "noise" in alarm data associated with an AIC 106 by recommending/determining/effectuating alarm configuration adjustments (e.g., increasing a threshold, increasing a delay, etc.) in one or more components of the AIC 106. Thus, it is to be appreciated and understood the illustrated embodiments for detecting regularly occurring alarms in an automated and industrial control system (AIC) provides a technical improvement to a computer-controlled AIC system by automating the process for detecting and grouping regularly occurring alarms in an AIC managed computer database.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of the illustrated embodiments, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer monitoring system for determining one or more clusters of regularly occurring time periods for alarm events, for alarm data in a computer database managed by an automated and industrial control (AIC) system, wherein each regularly occurring time period is defined by a same number of time spaced intervals, comprising:

one or more storage devices having instructions stored thereon that, when executed by one or more processors, cause the one or more processors to:

capture from the computer database, alarm data for each of a plurality of regularly occurring time periods contained in a defined time period, wherein the captured alarm data includes alarm change of state events and an associated time stamp for each of the alarm change of state events;

analyze the captured alarm data to detect alarm events contained in each time spaced interval, for each regularly occurring time period;

compute a vector of alarm state values for each regularly occurring time period such that an alarm state value is associated with a time spaced interval, dependent upon: 1) a detected alarm event when there is at least one detected alarm event in the associated time spaced interval; or 2) with at least one other alarm state value in a previous time spaced interval when there is no detected alarm event in the associated time spaced interval;

determine a distance metric between each pair of respective regularly occurring time periods based on the computed vectors of alarm state values in each respective pair of regularly occurring time periods;

determine one or more clusters of regularly occurring time periods of alarm events in the defined time period, based upon analysis of the determined distance metric between each pair of respective regularly occurring time periods; and provide a tangible output identifying the determined one or more clusters of regularly occurring time periods of alarm events in the defined time period.

2. The computer monitoring system as recited in claim 1, wherein each value in the vector of alarm state values is computed as: 1) a "1" when a last alarm event in the associated time spaced interval is an alarm event; 2) a "0" when the last alarm event in the associated time spaced interval is a reset event; and 3) equal to a value of a previous time spaced interval containing alarm events when there are no alarm events in the associated time spaced interval.

3. The computer monitoring system as recited in claim 1, wherein each regularly occurring time period consists of a regularly reoccurring calendar defined period of time.

4. The computer monitoring system as recited in claim 3, wherein the calendar defined period of time consists of one of: a calendar day, a calendar week, or a calendar month.

5. The computer monitoring system as recited in claim 1, wherein the time spaced intervals are one (1) minute time intervals.

6. The computer monitoring system as recited in claim 1, wherein the AIC is one of either a building management system (BMS) or a supervisory control and data acquisition (SCADA) system.

7. The computer monitoring system as recited in claim 1, wherein the alarm data is networked captured via a communications network.

8. The computer monitoring system as recited in claim 1, wherein the distance metric is a hamming distance.

9. The computer monitoring system as recited in claim 8, wherein determining the hamming distance between each successive time spaced regularly occurring time period further includes normalizing each hamming distance.

10. The computer monitoring system as recited in claim 1, wherein determining one or more clusters of regularly occurring time periods of alarm events includes:

analyze each cluster of regularly occurring time periods of alarm events to determine certain metadata associated with each cluster; and analyze the determined metadata for each cluster of regularly occurring time periods of alarm events to identify one or more clusters as a valid alarm periodicity cluster.

11. The computer monitoring system as recited in claim 10, whereby the tangible output identifies only valid clusters.

12. The computer monitoring system as recited in claim 1, wherein the one or more processors are further configured to determine clusters of regularly occurring time periods of alarm events in the defined time period using a plurality of unsupervised learning clustering algorithms.

13. The computer monitoring system as recited in claim 12, wherein at least one unsupervised learning algorithm consists of agglomerative techniques.

14. The computer monitoring system as recited in claim 12, wherein each unsupervised learning algorithm consists of one of a k-means clustering algorithm, k-medoids clustering algorithm, agglomerative clustering, or spectral clustering.

15. The computer monitoring system as recited in claim 12, wherein the unsupervised learning clustering algorithms, and their respective hyperparameter value(s), are selected according to a clustering goodness metric, whereby the unsupervised learning clustering algorithm and hyperparameter value(s) leading to the highest score value is selected for determining the clusters of similar regularly occurring time periods of alarm data to be analyzed.

16. The computer monitoring system as recited in claim 13, wherein the one or more processors are further configured to compute an artificial intelligence (AI) goodness measurement metric for each of the unsupervised learning clustering algorithms, whereby the unsupervised clustering algorithm having a highest score value is selected for determining the clusters of similar regularly occurring time periods of alarm data to be analyzed.

17. The computer monitoring system as recited in claim 16, wherein the AI goodness measurement metric is one of a Silhouette score, a Calinski-Harabasz Index, or a Davies-Bouldin index, or a combination thereof.

18. The computer monitoring system as recited in claim 1, wherein providing a tangible output includes causing a graphical user interface (GUI) to be generated on a computer display graphically indicating each identified valid cluster of regularly occurring time periods of alarm events.

19. A computer-implemented method for determining one or more clusters of regularly occurring time periods for alarm events, for alarm data in a computer database managed by an automated and industrial control (AIC) system, wherein each regularly occurring time period is defined by a same number of time spaced intervals, comprising:

capturing, in a computer processor, from the computer database, alarm data for each of a plurality of regularly occurring time periods contained in a defined time period, wherein the captured alarm data includes alarm change of state events and an associated time stamp for each of the alarm change of state events;

analyzing, in the computer processor, the captured alarm data to detect alarm events contained in each time spaced interval, for each regularly occurring time period;

computing, by the computer processor, a vector of alarm state values for each regularly occurring time period such that an alarm state value is associated with a time spaced interval, dependent upon: 1) a detected alarm event when there is at least one detected alarm event in the associated time spaced interval; or 2) with at least one other alarm state value in a previous time spaced interval when there is no detected alarm event in the associated time spaced interval;

determining, by the computer processor, a distance metric between each pair of respective regularly occurring time periods based on the computed vectors of alarm state values in each respective pair of regularly occurring time periods;

determining, by the computer processor, one or more clusters of regularly occurring time periods of alarm events in the defined time period, based upon analysis of the determined distance metric between each pair of respective regularly occurring time periods; and providing, by the computer processor, a tangible output identifying the determined one or more clusters of regularly occurring time periods of alarm events in the defined time period.

20. The computer-implemented method as recited in claim 19, wherein each value in the vector of alarm state values is computed as: 1) a "1" when a last alarm event in the associated time spaced interval is an alarm event; 2) a "0" when the last alarm event in the associated time spaced interval is a reset event; and 3) equal to a value of a previous time spaced interval containing alarm events when there are no alarm events in the associated time spaced interval.

21. The computer-implemented method as recited in claim 19, wherein each regularly occurring time period consists of a regularly reoccurring calendar defined period of time.

22. The computer-implemented method as recited in claim 21, wherein the calendar defined period of time consists of one of: a calendar day, a calendar week, or a calendar month.

23. The computer-implemented method as recited in claim 19, wherein the time spaced intervals are one (1) minute time intervals.

24. The computer-implemented method as recited in claim 19, wherein the AIC is one of a building management system (BMS) or a supervisory control and data acquisition (SCADA) system.

25. The computer-implemented method as recited in claim 19, wherein the alarm data is networked captured via a communications network.

26. The computer-implemented method as recited in claim 19, wherein the distance metric is a hamming distance.

27. The computer-implemented method as recited in claim 26, wherein determining the hamming distance between each successive time spaced regularly occurring time period further includes normalizing each hamming distance.

28. The computer-implemented method as recited in claim 19, wherein determining one or more clusters of regularly occurring time periods of alarm events further includes:

analyzing each cluster of regularly occurring time periods of alarm events to determine certain metadata associated with each cluster; and analyzing the determined metadata for each cluster of regularly occurring time periods of alarm events to identify one or more clusters as a valid alarm periodicity cluster.

29. The computer-implemented method as recited in claim 28, whereby the tangible output identifies only valid clusters.

30. The computer-implemented method as recited in claim 19, further including determining clusters of regularly occurring time periods of alarm events in the defined time period using a plurality of unsupervised learning clustering algorithms.

31. The computer-implemented method as recited in claim 30, wherein at least one unsupervised learning algorithm consists of agglomerative techniques.

32. The computer-implemented method as recited in claim 30, wherein each unsupervised learning algorithm consists of one of a k-means clustering algorithm, k-medoids clustering algorithm, agglomerative clustering, or spectral clustering.

33. The computer-implemented method as recited in claim 30, wherein the unsupervised learning clustering algorithms, and their respective hyperparameter value(s), are selected according to a clustering goodness metric, whereby the unsupervised learning clustering algorithm and hyperparameter value(s) leading to the highest score value is selected for determining the clusters of similar regularly occurring time periods of alarm data to be analyzed.

34. The computer-implemented method as recited in claim 33, wherein the clustering goodness metric is a Silhouette score, a Calinski-Harabasz Index, a Davies-Bouldin index, or a combination thereof.

35. The computer-implemented method as recited in claim 31, the method further comprising computing an artificial intelligence (AI) goodness measurement metric for each of the unsupervised learning clustering algorithms, whereby the unsupervised clustering algorithm having a highest score value is selected for determining the clusters of similar regularly occurring time periods of alarm data to be analyzed.

36. The computer-implemented method as recited in claim 19, wherein providing a tangible output includes causing a graphical user interface (GUI) to be generated on a computer display graphically indicating each identified valid cluster of regularly occurring time periods of alarm events.

* * * * *